United States Patent
Dean et al.

(10) Patent No.: US 9,866,116 B2
(45) Date of Patent: Jan. 9, 2018

(54) DIGITALLY VARIABLE SLOPE COMPENSATION CIRCUIT

(71) Applicant: DEAN TECHNOLOGY, INC., Addison, TX (US)

(72) Inventors: Craig Sean Dean, Carollton, TX (US); Lynn Edward Roszel, Wylie, TX (US); Scott Richard Wilson, Carrollton, TX (US); Erik Steven Haugarth, Plano, TX (US); Jan Simon Reuning, The Colony, TX (US)

(73) Assignee: Dean Technology, Inc., Addison, TX (US)

( * ) Notice: Subject to any disclaimer, the term of this patent is extended or adjusted under 35 U.S.C. 154(b) by 0 days.

(21) Appl. No.: 15/442,410

(22) Filed: Feb. 24, 2017

(65) Prior Publication Data

US 2017/0250602 A1 Aug. 31, 2017

Related U.S. Application Data

(60) Provisional application No. 62/300,645, filed on Feb. 26, 2016.

(51) Int. Cl.
*H02M 3/157* (2006.01)
*H02M 1/00* (2006.01)

(52) U.S. Cl.
CPC .... *H02M 3/157* (2013.01); *H02M 2001/0009* (2013.01); *H02M 2001/0025* (2013.01)

(58) Field of Classification Search
CPC ...... H02M 3/135; H02M 3/145; H02M 3/155; H02M 3/157; H02M 3/158; H02M 1/08; H02M 2000/0009; H02M 2001/0067; G05F 1/56; G05F 3/10
USPC ......... 363/265, 267, 268, 282–284, 349–351
See application file for complete search history.

(56) References Cited

U.S. PATENT DOCUMENTS

| | | | |
|---|---|---|---|
| 2008/0084196 A1* | 4/2008 | Lacombe ............. | H02M 3/156 323/282 |
| 2009/0231025 A1* | 9/2009 | Wang ....................... | G05F 1/56 327/543 |
| 2013/0307511 A1* | 11/2013 | De Vries ............. | H02M 3/1563 323/284 |

(Continued)

*Primary Examiner* — Adolf Berhane
(74) *Attorney, Agent, or Firm* — Buskop Law Group, P.C.; Wendy Buskop

(57) ABSTRACT

A digitally compensated circuit for a power supply having a plurality of integrated circuits. The plurality of integrated circuits has a digitally variable slope controller to adjust charge time of an inductor and voltage distortion and an adjustable voltage generator, which generates a modified voltage set point. The digitally compensated circuit has a comparator, which compares the modified voltage set point to a first feedback and turns off a comparator output signal when first feedback approaches or exceeds the modified voltage set point. An adjustable pulse width modulator generator produces an output voltage. A current monitor receives output voltage and provides a second feedback, which is transferred to the plurality of integrated circuits. An inductor receives output voltage and generates variable output power for a load, utilizing the digitally variable slope controller to reduce oscillation, system disturbances, and subharmonic oscillations over a dynamic voltage input range.

7 Claims, 3 Drawing Sheets

(56) References Cited

U.S. PATENT DOCUMENTS

| | | | | |
|---|---|---|---|---|
| 2014/0327421 A1* | 11/2014 | Arao | .................... | H02M 3/156 |
| | | | | 323/282 |
| 2015/0356226 A1* | 12/2015 | Yang | .................. | G06F 17/5072 |
| | | | | 716/120 |
| 2017/0194858 A1* | 7/2017 | Villot | .................... | H02M 3/158 |
| 2017/0237345 A1* | 8/2017 | Manlove | .............. | H02M 3/156 |
| | | | | 323/274 |
| 2017/0249001 A1* | 8/2017 | Roszel | ................... | G06F 1/324 |

\* cited by examiner

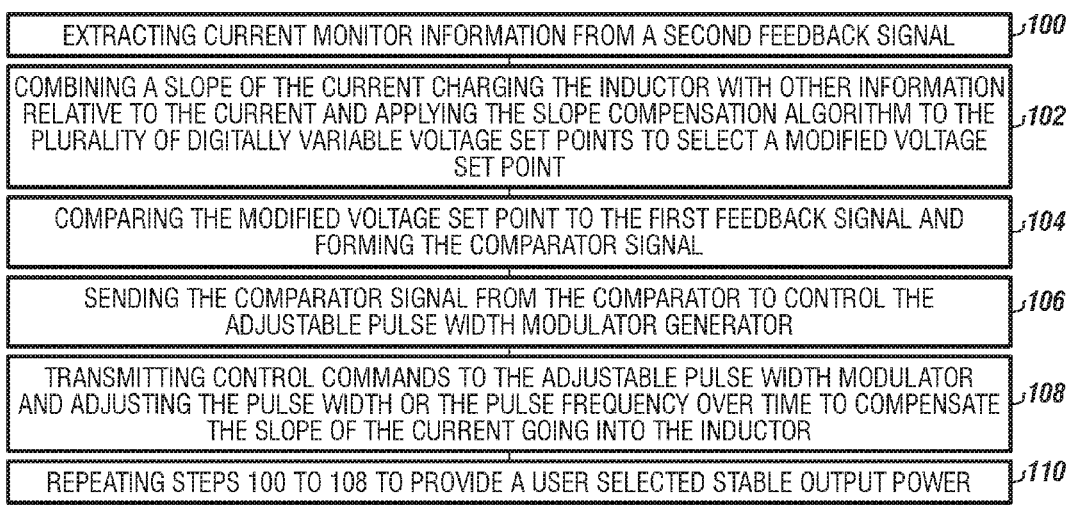

DIGITALLY VARIABLE SLOPE COMPENSATION CIRCUIT

CROSS REFERENCE TO RELATED APPLICATION

The present application claims priority to and the benefit of U.S. Provisional Patent Application Ser. No. 62/300,645 filed on Feb. 26, 2016, entitled "DIGITALLY VARIABLE SLOPE COMPENSATION CIRCUIT". This reference is hereby incorporated in its entirety.

FIELD

The present embodiments generally relate to a digitally compensated circuit.

BACKGROUND

A need exists for a digitally compensated circuit, such as for a power supply, that provides a steady consistent power output with adjustable voltage input.

The present embodiments meet this need.

BRIEF DESCRIPTION OF THE DRAWINGS

The detailed description will be better understood in conjunction with the accompanying drawings as follows:

FIG. 4 is a method of using a digitally variable slope controller according to one or more embodiments.

Figure 1:
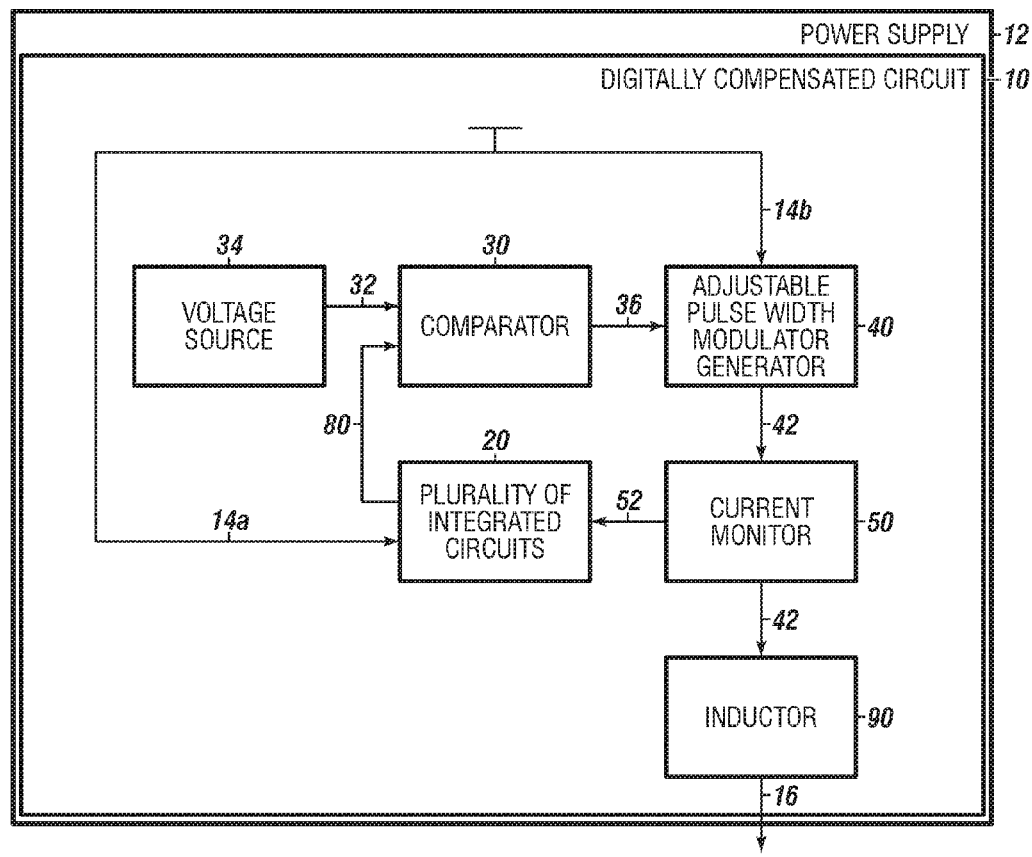
FIG. 1 depicts a diagram of an exemplary power supply with digitally compensated circuit according to an embodiment.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a digitally compensated circuit, such as for a power supply, that can have a plurality of integrated circuits.

The plurality of integrated circuits can have a digitally variable slope controller with a slope compensation algorithm having a variable slope for adjusting charge time of an inductor to reduce voltage distortion and an adjustable voltage generator.

The plurality of integrated circuits can generate a modified voltage set point without using resistors or capacitors, using the slope compensation algorithm and using a plurality of digitally variable voltage set points.

The digitally compensated circuit can have a comparator for receiving the modified voltage set point and a first feedback from a voltage source. The comparator can be configured to compare the modified voltage set point to the first feedback and turn off a comparator output signal when the first feedback approaches or exceeds the modified voltage set point.

An adjustable pulse width modulator generator can receive a variable input voltage from the power supply and comparator output signal and generate a variable output power.

A current monitor can receive an output voltage and provide a second feedback, which can be transferred to the plurality of integrated circuits.

An inductor can receive the output voltage and generate a variable output power for a load utilizing the digitally variable slope controller to reduce oscillation, system disturbances, and subharmonic oscillations over a dynamic voltage input range.

The digitally compensated circuit can provide a clear feedback signal that reduces noise in a power supply enabling shut down of the power supply quickly and accurately to prevent fires and explosions in the event of a fault or explosive overcurrent condition.

The digitally compensated circuit can prevent injury and death near a power supply by preventing spikes in the power supply exceeding human endurance and survivability.

In embodiments, the digitally compensated circuit can provide clean and accurate output to provide a stable power source for clear and accurate medical imaging applications, which can allow for early diagnosis of conditions.

The digitally compensated circuit can provide a smaller sized power supply to reduce the size and weight of medical equipment, which are needed in the event of a disaster.

In embodiments, the digitally compensated circuit can help provide a stable power source for contraband detection equipment used by the TSA and the National Security Administration to enhance security over terrorists attempting to bring contraband into the United States.

The digitally compensated circuit can allow for a wider variable input voltage range so that a single machine can be deployed in many areas, having many voltages and allowing multiple locations to be served sequentially without needing specially built machines for each location.

The term "adjustable pulse width modulator generator" as used herein can refer to a device that varies output pulse widths based on an input voltage.

The term "adjustable voltage generator" as used herein can refer to an internal circuit to the plurality of integrated circuits, generating a modified voltage set point without using resistors or capacitors by using the slope compensation algorithm and by using a plurality of digitally variable voltage set points. Exemplary digitally variable voltage set points can be 0.1 volts or 4.8 volts.

The term "charge time of an inductor" as used herein can refer to the duration of time needed for an inductor to charge with an input voltage that is an output voltage from the current monitor.

The term "comparator" as used herein can refer to a device for comparing two voltages and changes an output when the two voltages are equal or nearly equal.

The term "current monitor" as used herein can refer to a device that measures and converts a current to a voltage.

The term "digitally variable slope controller" as used herein can refer to a programmable device having a processor and computer instructions configured to instruct the processor to compare input voltages to output voltages and perform dynamic peak current mode control, using a slope compensation algorithm, having a variable slope to reduce voltage distortion.

The term "feedback" as used herein can refer to a signal when outputs of a system are routed back as inputs to the system, as part of a chain of cause and effect that forms a control circuit.

The term "inductor" as used herein can refer to a component that resists change in current in the system. In embodiments, the inductor can be a passive two terminal electrical component.

The term "input voltage" as used herein can refer to a variable input voltage that is from an external source to the power supply.

The term "integrated circuit" as used herein can refer to a set of electronic circuits on one small chip of semiconductor material.

The term "load" as used herein can refer to a device requiring the output power in order to operate.

The term "modified voltage set point" as used herein can refer to a set point that has been changed by the plurality of integrated circuits and referred to the new peak current allowed by the inductor.

The term "output voltage" as used herein can refer to a signal that can be used by the inductor to create a steady state output power.

The term "power" as used herein can refer to voltage and current.

The "power supply" as used herein can refer to an electronic device that supplies electronic energy to an electrical load such as a DC to DC converter or a universal input AC to DC power supply.

The term "slope compensation algorithm" as used herein can refer to a mathematical calculation that adjusts charge time of the inductor to reduce voltage distortion, such as Vs/Ts=Vsf.

The term "variable output power" as used herein can refer to the output current multiplied by the output voltage.

The term "variable slope" as used herein can refer to a mathematical calculation that increases or decreases a ramp rate based on a second feedback from a current monitor, such as adjusting a positive ramp with a negative slope.

The term "voltage distortion" as used herein can refer to an undesirable voltage wave form that causes unstable or distorted feedback.

The term "voltage source" as used herein can refer to a part of a circuit that interprets a variable input voltage into a signal that is readable by a comparator. In embodiments, the voltage source can be a DC voltage source.

Turning now to the Figures, FIG. 1 depicts a diagram of an exemplary power supply with digitally compensated circuit according to an embodiment.

A power supply 12 can have a digitally compensated circuit 10 with a plurality of integrated circuits 20.

The digitally compensated circuit 10 can have a comparator 30 to receive a modified voltage set point 80 from the plurality of integrated circuits 20.

The comparator 30 can receive a first feedback signal 32 from a voltage source 34 in the power supply 12.

The comparator 30 can be configured to compare the modified voltage set point 80 to the first feedback signal 32 and provide a comparator signal 36 when the first feedback signal 32 approaches or exceeds the modified voltage set point 80.

In embodiments, the voltage source 34 can be a digital to analog converter.

The digitally compensated circuit 10 can receive a variable input voltage 14a and 14b, which can be from 1 volt to 150 volts of DC current, such as from 4 DC volts to 42 DC volts. A first variable input voltage 14a can be transferred to the plurality of integrated circuits 20. An adjustable pulse width modulator generator 40 can receive a second variable input voltage 14b as well as the comparator signal 36.

In embodiments, the adjustable pulse width modulator generator 40 can create a lower voltage than the variable input voltage 14b.

In embodiments, the adjustable pulse width modulator generator 40 can create a higher voltage than the variable input voltage 14b.

The adjustable pulse width modulator generator 40 can use various switching devices, such as metal oxide semiconductor field effect transistors, to turn on and off to generate an output voltage 42.

The adjustable pulse width modulator generator 40 can generate the output voltage 42.

In embodiments, the adjustable pulse width modulator generator 40 can be a buck regulator or a boost regulator.

A current monitor 50 in the power supply 12 can receive the output voltage 42 from the adjustable pulse width modulator generator 40 and provide a second feedback signal 52 to the plurality of integrated circuits 20.

In embodiments, the digitally compensated circuit 10 can use the current monitor and the voltage source as two separate units, or the voltage source and the current monitor in an integrated unit.

The output voltage 42 can be transferred through the current monitor 50 to an inductor 90.

Figure 2:
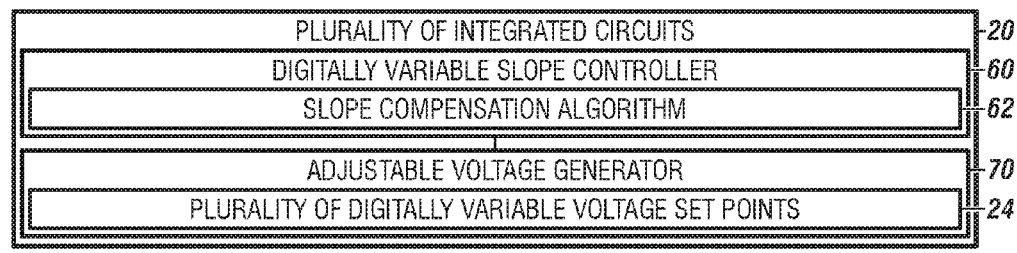
FIG. 2 depicts a diagram of the plurality of integrated circuits according an additional embodiment.

The inductor 90 can supply variable output power 16 for a load utilizing a digitally variable slope controller 60, which is shown in FIG. 2, of the plurality of integrated circuits to reduce oscillations, system disturbances, and subharmonic oscillations over a dynamic voltage input range.

The digitally compensated circuit 10 produces a variable output power 16 that ranges from 1 volt to 150 kilovolts.

FIG. 2 depicts a diagram of the plurality of integrated circuits according to an additional embodiment.

In embodiments, the plurality of integrated circuits 20 can have a digitally variable slope controller 60. The slope controller 60 can contain a slope compensation algorithm 62. The slope compensation algorithm 62 can calculate a variable slope for adjusting the charge time of the inductor to reduce voltage distortion.

In addition, the plurality of integrated circuits 20 can have an adjustable voltage generator 70. The adjustable voltage generator 70 can produce the modified voltage set point without using resistors or capacitors by applying the slope compensation algorithm 62 from the digitally variable slope controller 60 to a plurality of digitally variable voltage set points 24.

Figure 3:
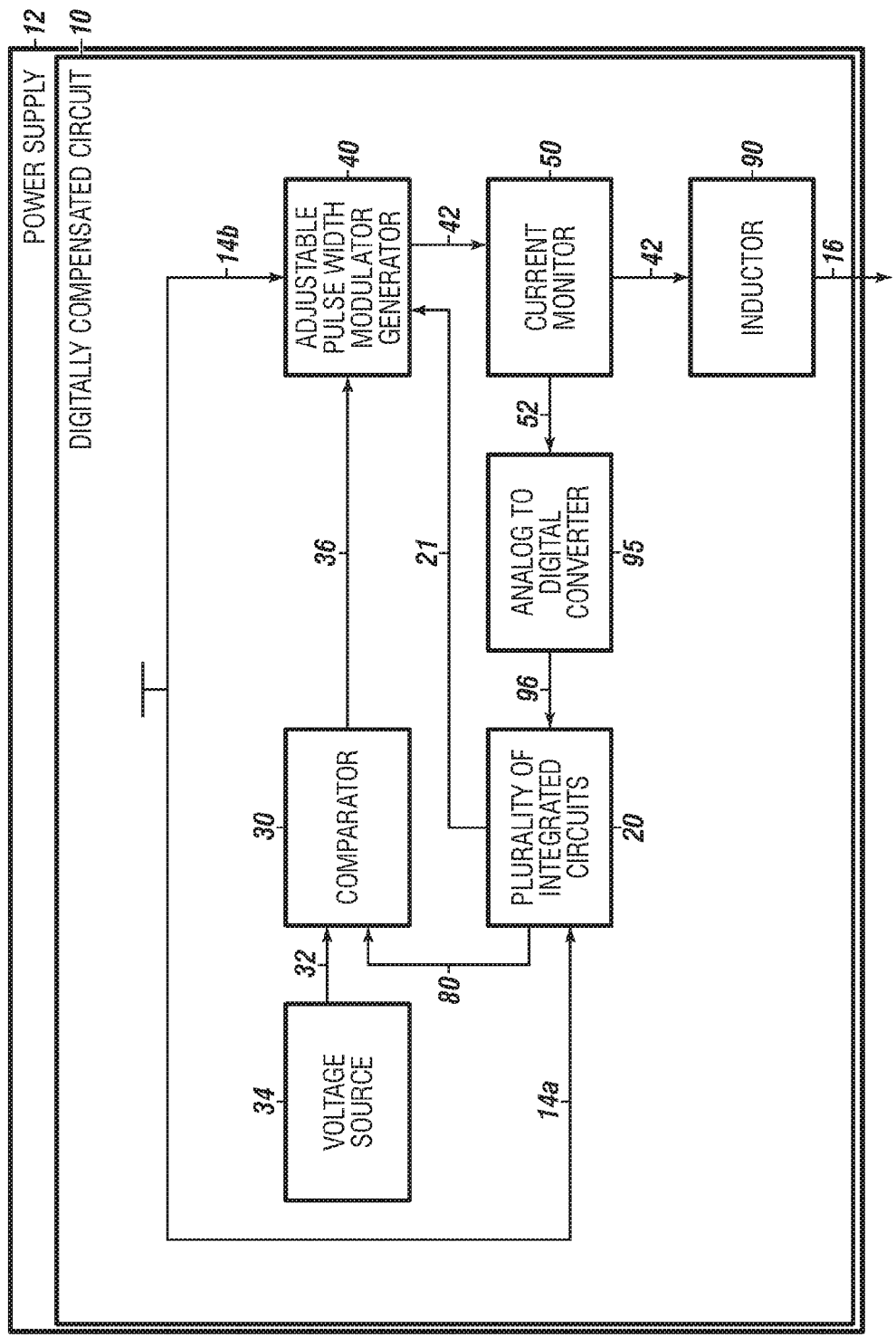
FIG. 3 depicts the power supply with digitally compensated circuit according to one or more embodiments.

FIG. 3 depicts the power supply with digitally compensated circuit according to one or more embodiments.

The power supply 1.2 can contain the digitally compensated circuit 10 with the plurality of integrated circuits 20, wherein the plurality of integrated circuits 20 can receive a converted signal 96 from an analog to digital converter 95. The analog to digital converter can be positioned to receive the second feedback signal 52 from the current monitor 50. The analog to digital converter 95 can transfer the converted signal 96 to the plurality of integrated circuits 20.

The plurality of integrated circuits 20 can provide control commands 21 to the adjustable pulse width modulator generator 40 to adjust at least a frequency of the adjustable pulse width modulator generator 40.

In embodiments, the variable input voltages 14a and 14b can be from 1 volt to 150 volts of DC current. The first variable input voltage 14a can be transferred to the plurality of integrated circuits 20. The adjustable pulse width modulator generator 40 can receive the second variable input voltage 14b as well as the comparator signal 36.

The digitally compensated circuit 10 can have the comparator 30 to receive the modified voltage set point 80 from the plurality of integrated circuits 20.

The comparator 30 can receive the first feedback signal 32 from the voltage source 34 in the power supply 12.

The comparator 30 can be configured to compare the modified voltage set point 80 to the first feedback signal 32 and provide the comparator signal 36 when the first feedback signal 32 approaches or exceeds the modified voltage set point 80.

The output voltage 42 can be transferred through the current monitor 50 to the inductor 90.

The inductor 90 can supply variable output power 16 for a load.

FIG. 4 is a method of using a digitally variable slope controller according to one or more embodiments.

The method of using the digitally variable slope controller can include extracting current monitor information from a second feedback signal, as illustrated in box 100.

In embodiments, the current monitor information can be a voltage level that can represent a peak current The method of using the digitally variable slope controller can include combining a slope of the current charging the inductor with other information relative to the current and applying the slope compensation algorithm to the plurality of digitally variable voltage set points to select a modified voltage set point, as illustrated in box 102.

The method of using the digitally variable slope controller can include comparing the modified voltage set point to a first feedback signal and forming the comparator signal, as illustrated in box 104.

The method of using the digitally variable slope controller can include sending the comparator signal from the comparator to control the adjustable pulse width modulator generator, as illustrated in box 106.

The method of using the digitally variable slope controller can include transmitting control commands to the adjustable pulse width modulator and adjusting the pulse width or the pulse frequency over time to compensate the slope of the current going into the inductor, as illustrated in box 108.

The method of using the digitally variable slope controller can include repeating steps 100 to 108 to provide a user selected stable output power, as illustrated in box 110.

While these embodiments have been described with emphasis on the embodiments, it should be understood that within the scope of the appended claims, the embodiments might be practiced other than as specifically described herein.

What is claimed is:

1. A digitally compensated circuit for a power supply comprising:
   a. a voltage source for providing a first feedback signal;
   b. a plurality of integrated circuits for receiving a first variable input voltage from a voltage source and the first feedback signal, the plurality of integrated circuits comprising:
      (i) a digitally variable slope controller comprising a slope compensation algorithm, wherein the slope compensation algorithm has a variable slope for adjusting a charge time of an inductor to reduce a voltage distortion; and
      (ii) an adjustable voltage generator for generating a modified voltage set point without using resistors or capacitors by applying the slope compensation algorithm to a plurality of digitally variable voltage set points;
   c. a comparator configured to receive the first feedback signal and the modified voltage set point, wherein the comparator is configured to compare the modified voltage set point to the first feedback signal and produce a comparator signal when the first feedback signal approaches or exceeds the modified voltage set point;
   d. an adjustable pulse width modulator generator configured to receive a second variable input voltage from the voltage source and the comparator signal from the comparator, wherein the adjustable pulse width modulator generates an output voltage;
   e. a current monitor configured to receive the output voltage from the adjustable pulse width modulator generator and provide a second feedback signal, wherein the second feedback signal communicates with the plurality of integrated circuits; and
   f. the inductor configured to receive the output voltage through the current monitor and generate a variable output power for use by the power supply for a load, wherein a current through the inductor is controlled by the digitally variable slope controller, further wherein the digitally variable slope controller is configured to reduce oscillations, reduce system disturbances, and reduce subharmonic oscillations over a dynamic voltage input range.

2. The digitally compensated circuit of claim 1, wherein the voltage source is a digital to analog converter.

3. The digitally compensated circuit of claim 1, wherein the adjustable pulse width modulator generator is a buck regulator or a boost regulator.

4. The digitally compensated circuit claim 1, wherein an analog to digital converter is positioned to receive the second feedback signal from the current monitor and transfer a converted signal to the plurality of integrated circuits.

5. The digitally compensated circuit of claim 1, wherein the power supply produces the first variable input voltage, the second variable input voltage, or both the first variable input voltage and the second variable input voltage at a voltage from 1 DC to 150 DC.

6. The digitally compensated circuit of claim 1, wherein the inductor produces the variable output power from 1 volt to 150 kilovolts.

7. The digitally compensated circuit of claim 1, wherein the plurality of integrated circuits provide control commands to the adjustable pulse width modulator generator to adjust at least a frequency of the adjustable pulse width modulator generator.

* * * * *